United States Patent
Christmann et al.

(10) Patent No.: US 10,066,540 B2
(45) Date of Patent: Sep. 4, 2018

(54) CONTROL ARRANGEMENT OF AN EXHAUST-GAS TURBOCHARGER

(71) Applicant: BorgWarner Inc., Auburn Hills, MI (US)

(72) Inventors: Ralf Christmann, Kaiserslautern (DE); Raduz Zahoransky, Marnheim (DE)

(73) Assignee: BorgWarner Inc., Auburn Hills, MI (US)

( * ) Notice: Subject to any disclaimer, the term of this patent is extended or adjusted under 35 U.S.C. 154(b) by 248 days.

(21) Appl. No.: 14/784,630

(22) PCT Filed: Apr. 22, 2014

(86) PCT No.: PCT/US2014/034883
§ 371 (c)(1),
(2) Date: Oct. 15, 2015

(87) PCT Pub. No.: WO2014/179105
PCT Pub. Date: Nov. 6, 2014

(65) Prior Publication Data
US 2016/0069253 A1 Mar. 10, 2016

(30) Foreign Application Priority Data
Apr. 30, 2013 (DE) .......... 10 2013 007 444

(51) Int. Cl.
*F01D 17/10* (2006.01)
*F01D 17/20* (2006.01)
(Continued)

(52) U.S. Cl.
CPC .......... *F02B 37/186* (2013.01); *F01D 17/105* (2013.01); *F01D 17/20* (2013.01);
(Continued)

(58) Field of Classification Search
CPC ...... F02B 37/18; F02B 37/183; F02B 37/186; F02B 39/00; F01D 17/10; F01D 17/105;
(Continued)

(56) References Cited

U.S. PATENT DOCUMENTS 7,080,510 B2 * 7/2006 Ishihara ................ F02B 37/183
251/14
7,644,583 B2 * 1/2010 Leavesley ............... F02B 37/18
415/156

(Continued)

FOREIGN PATENT DOCUMENTS

| EP | 1937948 B1 | 1/2012 | |
|---|---|---|---|
| EP | 1644625 B1 | 2/2012 | |
| JP | 2011144762 A | * 7/2011 | ........... F01D 17/105 |

OTHER PUBLICATIONS

International Search Report and Written Opinion in International Application No. PCT/US2014/034883, dated Aug. 26, 2014.

*Primary Examiner* — Logan Kraft
*Assistant Examiner* — Christopher R Legendre
(74) *Attorney, Agent, or Firm* — Eric L. Doyle; Stephan A. Pendorf; Patent Central LLC

(57) ABSTRACT

A control arrangement (1) of an exhaust-gas turbocharger having a bearing bushing (3); a control shaft (4) which is connected at a first end (5) to a first adjustment lever (6) and which is guided in the bearing bushing (3); and a second adjustment lever (9) which is connected to a second end (8) of the control shaft (4) and which, on a free end region (10), bears a control device (11), wherein the free end region (10) is designed to be cranked in the direction of the first adjustment lever (6).

16 Claims, 4 Drawing Sheets

(51) Int. Cl.
*F01D 25/16* (2006.01)
*F01D 25/24* (2006.01)
*F02B 37/18* (2006.01)
*F02B 39/00* (2006.01)

(52) U.S. Cl.
CPC ............ *F01D 25/16* (2013.01); *F01D 25/24* (2013.01); *F02B 37/183* (2013.01); *F02B 39/00* (2013.01); *F05D 2220/40* (2013.01); *Y02T 10/144* (2013.01)

(58) Field of Classification Search
CPC .......... F01D 17/12; F01D 17/20; F01D 25/16; F05D 2220/40
See application file for complete search history.

(56) References Cited

U.S. PATENT DOCUMENTS

| | | | |
|---|---|---|---|
| 8,733,101 B2 * | 5/2014 | Hoshi | F01D 17/105 251/299 |
| 2005/0079049 A1 | 4/2005 | Ishiara et al. | |
| 2006/0213195 A1 | 9/2006 | Leavesley | |
| 2006/0289072 A1 | 12/2006 | McMullen et al. | |
| 2012/0260651 A1 | 10/2012 | Boening et al. | |
| 2012/0317975 A1 * | 12/2012 | Schoenherr | F02B 37/183 60/602 |
| 2016/0069253 A1 * | 3/2016 | Christmann | F01D 17/20 415/145 |

* cited by examiner

CONTROL ARRANGEMENT OF AN EXHAUST-GAS TURBOCHARGER

BACKGROUND OF THE INVENTION

Field of the Invention

The invention relates to a control arrangement of an exhaust-gas turbocharger and to a turbine housing of an exhaust-gas turbocharger.

Description of the Related Art

A control arrangement of said type and a turbine housing of said type are known from DE 20 2007 019 447 U1. Said document describes an exhaust-gas turbocharger having a control arrangement which has a control shaft for the actuation of a wastegate flap by means of an actuator, said control shaft being guided in a bearing bushing and being connected at its free end to an adjustment lever. On a lever surface pointing away from a bearing bushing of the control shaft, there is arranged a connecting piece to which a regulating rod of the actuator is connected.

The absorption of all axial and radial forces between the shaft and the bearing bushing occurs in the vicinity of the two ends thereof. The reaction forces that are absorbed in the bearing bushing are dependent on a pressure drop along the wastegate, on the kinetic energy of the exhaust gases, and on the actuating forces.

BRIEF SUMMARY OF THE INVENTION

It is an object of the present invention to provide a control arrangement by means of which it is possible for the reaction force at the bearing point to be minimized, such that preferably, the force engagement points are situated with an optimized axial spacing.

BRIEF DESCRIPTION OF THE SEVERAL VIEWS OF THE DRAWINGS

Further details, advantages and features of the present invention become apparent from the following description of an exemplary embodiment with reference to the drawing, in which.

DETAILED DESCRIPTION OF THE INVENTION

Figure 1:
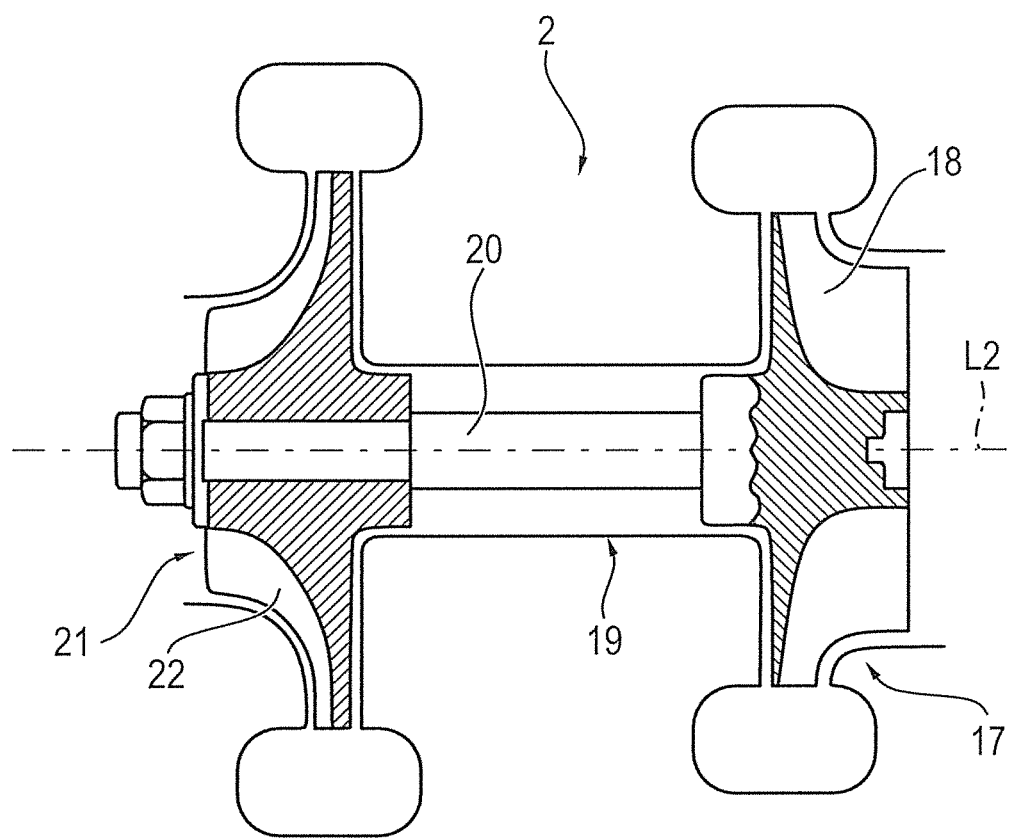
FIG. 1 shows a schematically greatly simplified diagrammatic illustration of an exhaust-gas turbocharger according to the invention.

FIG. 1 illustrates an exhaust-gas turbocharger 2 according to the invention which, as main components, has a turbine housing 17 with a turbine wheel 18 arranged therein. The turbine wheel 18 is arranged on one end of a shaft 20 which is mounted in a bearing housing 19. On the other end, the shaft 20 bears a compressor wheel 22 which is arranged in a compressor housing 21. An exhaust-gas turbocharger 2 of said type may be equipped with a control arrangement, which will be explained in detail below on the basis of FIG. 2.

Figure 2:
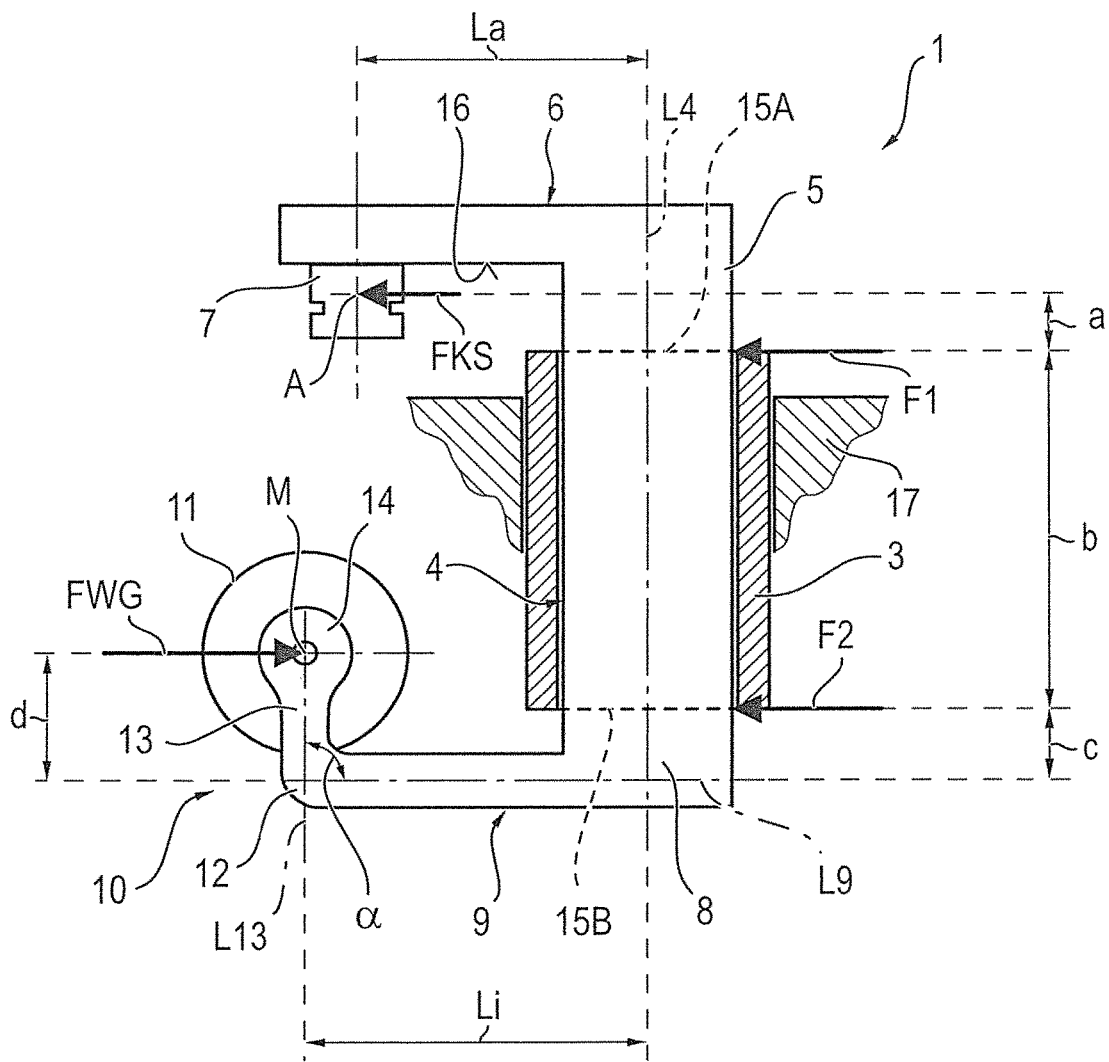
FIG. 2 shows a schematically simplified illustration of an embodiment of a control arrangement according to the invention, on the basis of the example of a wastegate flap.

In the example illustrated in FIG. 2, the control arrangement 1 serves for the actuation of a wastegate flap (charge-pressure regulating flap) of a wastegate arrangement of the turbine housing 17. The invention is however not restricted to a wastegate arrangement of said type, and may also be used for other control devices on the turbine side and on the compressor side.

The control arrangement 1 has a bearing bushing 3 which is arranged in the turbine housing 17.

Furthermore, the control arrangement 1 has a control shaft 4 which is connected at a first end 5 to a first adjustment lever 6. The control shaft 4 is guided in the bearing bushing 3, as can be seen from FIG. 2.

On the adjustment lever 6 there is arranged a connecting piece 7 which, in the particularly preferred embodiment illustrated in FIG. 2, is arranged on a surface 16, which points toward the bearing bushing 3, of the adjustment lever 6.

Furthermore, the control arrangement 1 has a second adjustment lever 9 which is connected to a second end 8 of the control shaft 4 and which, on a free end region 10, bears a control device 11 which, in the example, is in the form of a wastegate flap.

As shown in FIG. 2, the free end region 10 is designed to be cranked in the direction of the first adjustment lever 6, such that an axial offset d-c is formed between the wastegate flap and an end section 15B of the bearing bushing 3 in the direction of the first adjustment lever 6. For this purpose, the end region 10 has a bend section 12 which is connected to a holding section 13, the free end 14 of which bears the wastegate flap 11. As shown in this regard in FIG. 2, the second adjustment lever 9 has a longitudinal central line L9 and the holding section 13 has a longitudinal central line L13. Said two longitudinal central lines are at an angle α relative to one another, as can be seen from FIG. 2. In one refinement, the value of said angle α is approximately 90°. Angles α of 60° to 120°, in particular 80° to 100°, are also possible depending on the available space in the turbine housing 17.

The dimension a illustrated in FIG. 2 is a spacing between a first end 15A of the bearing bushing 3 and an engagement point A at which, for the purpose of opening and closing the control device 11, a regulating device (not illustrated) introduces a force FKS into the connecting piece 7. The dimension b shown in FIG. 2 is the spacing between the ends 15A and 15B of the bearing bushing 3. The dimension c is a spacing between the second end region 15B (situated toward the inside in relation to the turbine) of the bearing bushing 3 and the longitudinal central line L9 of the second adjustment lever 9. The dimension d is the spacing of the longitudinal central line L9 of the second adjustment lever 9 to a force introduction point M of the control device 11.

Also shown for illustrative purposes are a force FWG acting on the wastegate flap, said force acting substantially orthogonally with respect to the plane of the drawing during operation, and a resultant force F2 acting on the first end region 15A.

The force acting on the control device 11 or the wastegate flap results from pulsating exhaust-gas pressures. The control shaft 4 and the bearing bushing 3 are subject to increased wear in particular in the region of the end regions 15A and 15B. The lower the resultant forces F1 and F2 that act there are, the lower is the wear. Said forces F2 and FWG are in approximately the following relationship with respect to one another:

$$F2 \cdot b = FWG(b-(d-c)).$$

The wear-inducing force F2 can be reduced by means of the offset d–c. Here, the offset d–c may only be selected to be of such a magnitude that the control device 11, during its adjustment travel from a closed position into a desired open position (not illustrated), does not abut against the inside of the turbine housing 17. The resultant force F2 in the second end region 15A can be reduced to a minimum if a ratio of the offset (d–c) to the dimension b is approximately equal to 0.5. With this force F2 reduced to a minimum, it can be expected that the control shaft 4 and the bearing bushing 3 will experience low wear.

Said relationship mentioned before the preceding paragraph is achieved owing to the above-described cranked configuration of the free end region 10 by means of the bend section 12 and the holding section 13, which bears the wastegate flap 11. As explained in the introduction, an optimization of the absorption of forces in the control arrangement 1 according to the invention is possible with this configuration.

Figure 3:
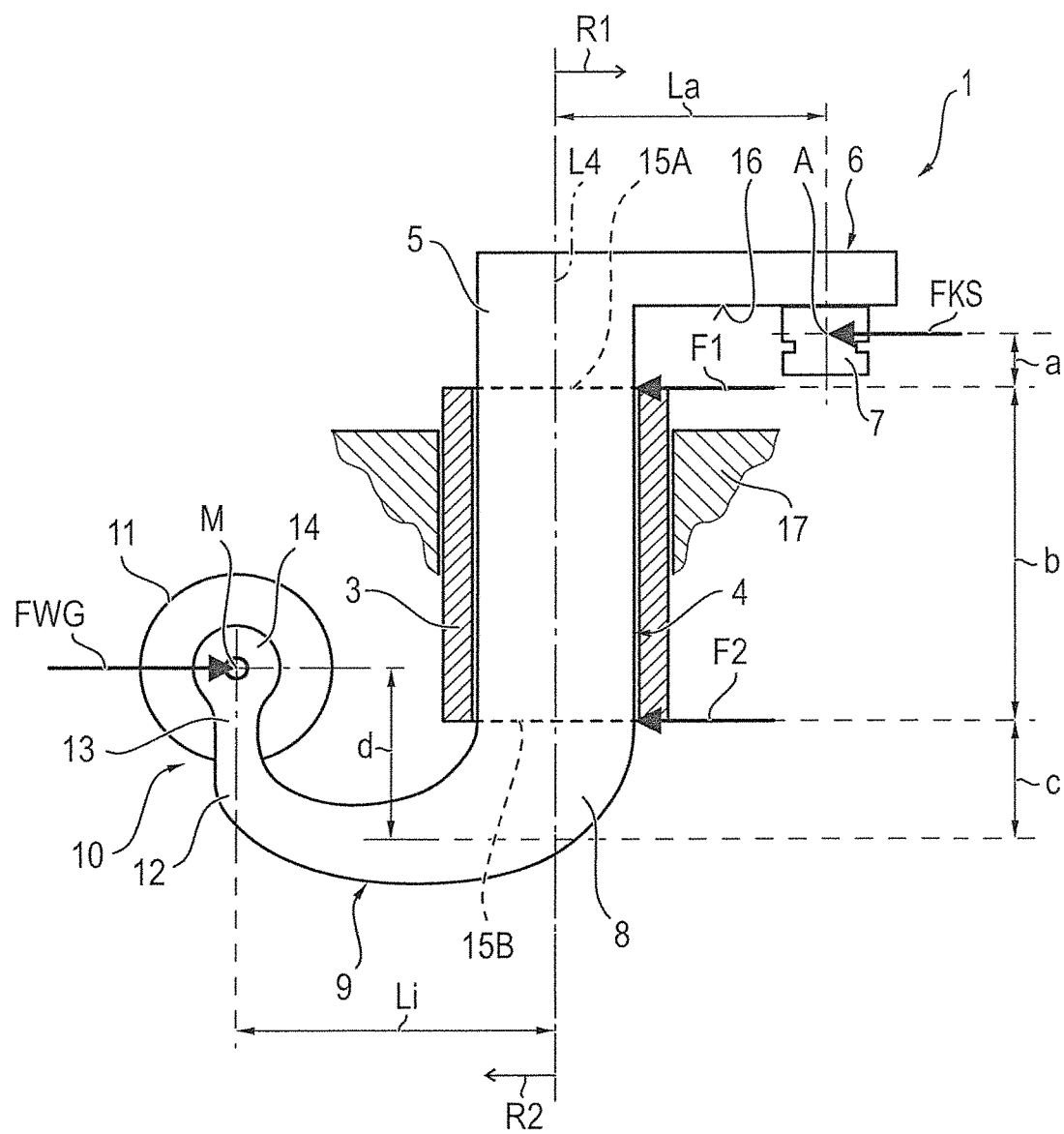
FIG. 3 shows a schematically simplified illustration of a further embodiment of a control arrangement according to the invention, with adjustment levers facing away from one another.

FIG. 3 shows a further embodiment with forces F1 and F2 further reduced through structural means, wherein the second adjustment lever 9 and the free end region 10 extend in bent form out of the bearing bushing 3 and there is thus no distinct separation between the elements end region 10, connecting lever 9 and control shaft 4 and bend section 12. It may thus be the case under some circumstances that the longitudinal central line L9 and accordingly the dimension c cannot be readily gathered from the component or from a construction. In this case, the difference between the dimension d and the dimension c, as offset d–c, is to be regarded as the spacing between the force engagement point M and the free end region 15B of the bearing bushing 3. With known dimensions b, c, d, or (c–d), Li and La, and with connecting levers 6 and 9 offset where possible through 180° relative to one another, it has been found that wear can be reduced to a minimum, by keeping the forces F1 and F2 low, if the following relationship is adhered to to within 90 to 110%:

$$a = La/Li \cdot (b/2+(c-d)) - b/2.$$

It is evident that an offset c–d is incorporated as a negative term and that, accordingly, the dimension a may in some cases also be less than or equal to zero, which may be made possible by means of a corresponding (not illustrated) turbine housing and adjustment lever geometry and a correspondingly long connecting piece 7.

Figure 4:
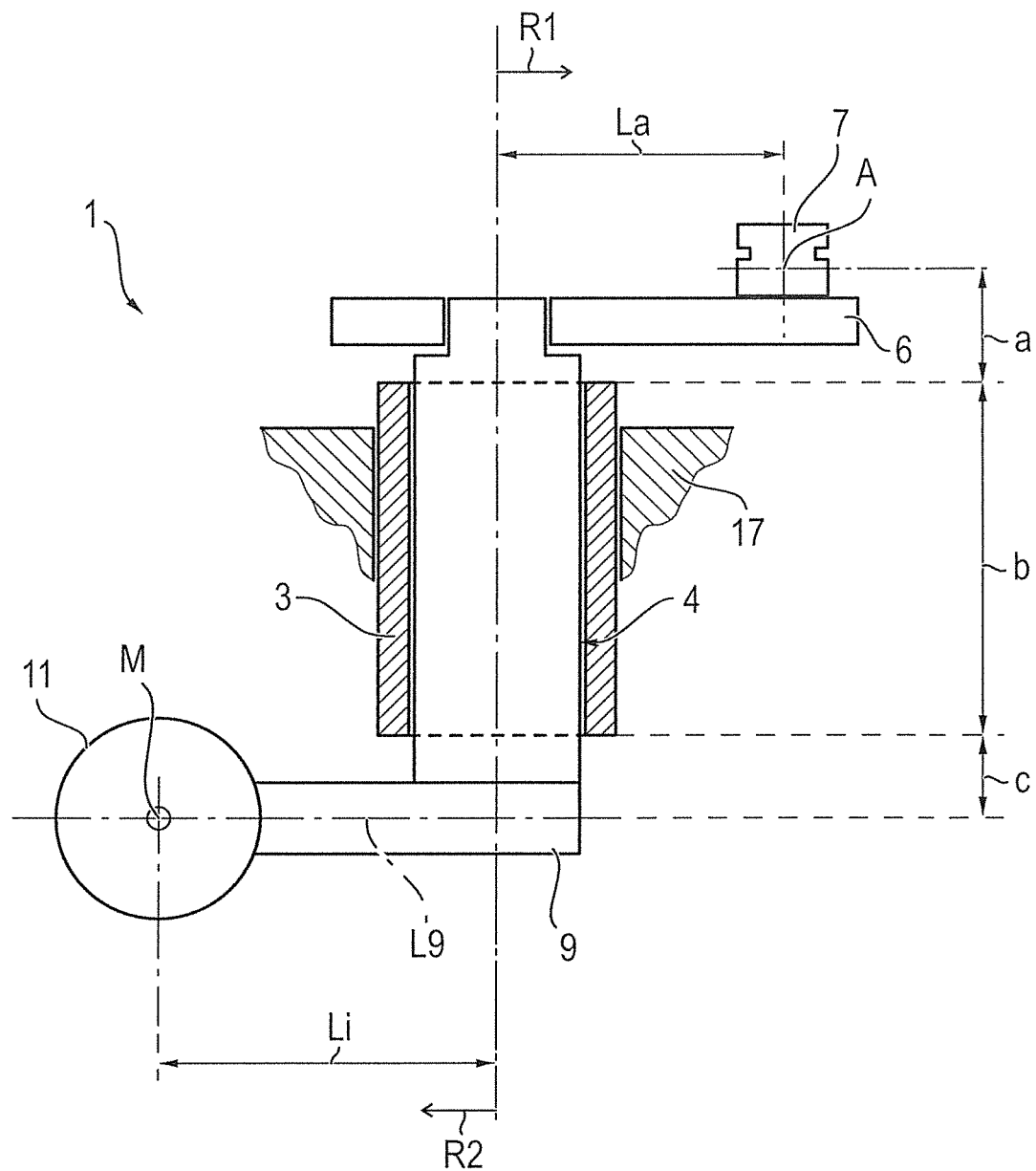
FIG. 4 shows a schematically simplified illustration of a further embodiment of a control arrangement, with adjustment levers facing away from one another.

FIG. 4 shows a further control arrangement 1 in which the dimension d is equal to zero. Accordingly, d is omitted from the above-mentioned relationship, and the following relationship applies only to within 90 to 110%:

$$a = La/Li \cdot (b/2+c) - b/2.$$

With this dimension a, correspondingly reduced forces F1 and F2 can be expected, whereby the wear of the control shaft 4 and of the bearing bushing 3 can be kept low.

By contrast to the embodiment as per FIG. 2, FIGS. 3 and 4 also show that the first connecting lever 6 extends in a first direction R1 proceeding from the longitudinal central line L4 of the control shaft 4, that is to say to the right in the illustration shown in FIGS. 3 and 4. By contrast, the second connecting lever 9 extends in a second direction R2 proceeding from the longitudinal central line L4 of the control shaft 4, said second direction being opposed to the first direction R1, as shown in FIGS. 3 and 4.

In the embodiment as per FIG. 3, the connecting piece 7 is oriented in the direction of the turbine housing 17, that is to say downward on the surface 16 of the adjustment lever 6 in the illustration shown in FIG. 3, whereas said connecting piece is oriented in the opposite direction in the embodiment of FIG. 4.

In addition to the above written description of the invention, reference is hereby explicitly made, for additional disclosure thereof, to the diagrammatic illustration of the invention in FIGS. 1, 2, 3 and 4.

LIST OF REFERENCE SIGNS

1 Control arrangement
2 Exhaust-gas turbocharger
3 Bearing bushing
4 Control shaft
5 First end of the control shaft 4
6 First (outer) adjustment lever
7 Connecting piece
8 Second end of the control shaft 4
9 Second (inner) adjustment lever
10 Free end region
11 Control device (in particular wastegate flap)
12 Bend section
13 Holding section
14 Free end of the holding section 13
15A First end region of the bearing bushing 3
15B Second end region of the bearing bushing 3
16 Surface of the adjustment lever 6
17 Turbine housing
18 Turbine wheel
19 Bearing housing
20 Shaft
21 Compressor housing
22 Compressor wheel
F1 Force in the first end region 15A
F2 Force in the second end region 15B
FWG Force acting on the wastegate flap
L2 Longitudinal central line of the exhaust-gas turbocharger
L4 Longitudinal central line of the control shaft 4
L9 Longitudinal central line of the second adjustment lever 9
L13 Longitudinal central line of the holding section 13
α Angle
A Engagement point on the first adjustment lever 6
a Spacing between the first end region 15A and the engagement point A
b Spacing between the first end region 15A and the second end region 15B
c Spacing between the second end region 15B and the longitudinal central axis L9 of the second adjustment lever 9
d Spacing between the longitudinal central axis L9 of the second adjustment lever 9 and the central point M of the control device 11
M Central point of the control device 11
La Effective length of the first adjustment lever 6
Li Effective length of the second adjustment lever 9
R1 First direction
R2 Second direction

The invention claimed is:

1. A control arrangement (1) of an exhaust-gas turbocharger, having
a bearing bushing (3);

a control shaft (4) which is connected at a first end (5) to a first adjustment lever (6) and which is guided in the bearing bushing (3); and a second adjustment lever (9) which is connected to a second end (8) of the control shaft (4) and which, on a free end region (10), bears a control device (11), wherein the free end region (10) is cranked towards the first adjustment lever (6), a central point (M) of the control device (11) is axially offset with respect to a second end region (15B) of the bearing bushing (3) by an offset (d-c), the bearing bushing (3) extends axially over a dimension (b) and the offset (d-c) to the dimension (b) is a ratio of 0.1 to 0.6.

2. The control arrangement as claimed in claim 1, wherein the free end region (10) has a bend section (12) and a holding section (13) adjoining said bend section, the holding section having a holding section free end (14), wherein the control device (11) is arranged on the holding section free end (14).

3. The control arrangement as claimed in claim 1, wherein the control device (11) is a wastegate flap.

4. The control arrangement as claimed in claim 1, wherein a connecting piece (7) is arranged on a surface (16), which points toward the bearing bushing (3), of the first adjustment lever (6).

5. The control arrangement as claimed in claim 1, wherein the first adjustment lever (6) extends in a first direction (R1) and wherein the second adjustment lever (9) extends in a second direction (R2), wherein the first and second directions (R1; R2) are offset relative to one another by 165° to 195°.

6. A turbine housing (17) of an exhaust-gas turbocharger (2)

having the control arrangement (1) according to claim 1.

7. The turbine housing as claimed in claim 6, wherein the free end region (10) has a bend section (12) and a holding section (13) adjoining said bend section, the holding section having a holding section free end (14), wherein the control device (11) is arranged on the holding section free end (14).

8. The turbine housing as claimed in claim 6, wherein the control device (11) is a wastegate flap.

9. The turbine housing as claimed in claim 6, wherein the offset (d-c) to the dimension (b) is a ratio of 0.45 to 0.55.

10. The turbine housing as claimed in claim 6, wherein a connecting piece (7) is arranged on a surface (16), which points toward the bearing bushing (3), of the first adjustment lever (6).

11. The turbine housing as claimed in claim 6, wherein the first adjustment lever (6) extends in a first direction (R1) and wherein the second adjustment lever (9) extends in a second direction (R2), wherein the first and second directions (R1; R2) are offset relative to one another by 165° to 195°.

12. The control arrangement as claimed in claim 1, wherein the offset (d-c) to the dimension (b) is a ratio of 0.45 to 0.55.

13. The control arrangement as claimed in claim 1, wherein the first adjustment lever (6) extends in a first direction (R1) and wherein the second adjustment lever (9) extends in a second direction (R2), wherein the first and second directions (R1; R2) are offset relative to one another by 170° to 190°.

14. The control arrangement as claimed in claim 1, wherein the first adjustment lever (6) extends in a first direction (R1) and wherein the second adjustment lever (9) extends in a second direction (R2), wherein the first and second directions (R1; R2) are offset relative to one another by 175° to 185°.

15. A control arrangement (1) of an exhaust-gas turbocharger, having a bearing bushing (3);

a control shaft (4) which is connected at a first end (5) to a first adjustment lever (6) and which is guided in the bearing bushing (3); and a second adjustment lever (9) which is connected to a second end (8) of the control shaft (4) and which, on a free end region (10), bears a control device (11), wherein the free end region (10) is cranked towards the first adjustment lever (6), and a control arrangement geometry is defined by the relationship:

$$0.9 \leq a/(La/Li \cdot (b/2+(c-d))-b/2) \leq 1.1$$

where the components in said relationship represent the following:

a: spacing between a first end region (15A), which faces toward the first adjustment lever (6), of the bearing bushing (3) and an engagement point (A) of the first adjustment lever (6);

La: effective length of the first adjustment lever (6);

Li: effective length of the second adjustment lever (9);

b: spacing between the first end region (15A) and a second end region (15B), which faces toward the second adjustment lever (9), of the bearing bushing (3); and c: spacing between the second end region (15B) and a longitudinal central line (L9) of the second adjustment lever (9);

d: spacing between the second end region (15B) and a force introduction point (M) at which the control device (11) is arranged.

16. A turbine housing (17) of an exhaust-gas turbocharger (2)

having a control device (11) which is operatively connected to a control arrangement (1) which has the following components:

a bearing bushing (3);

a control shaft (4) which is connected at a first end (5) to a first adjustment lever (6) and which is guided in the bearing bushing (3); and a second adjustment lever (9) which is connected to a second end (8) of the control shaft (4) and which, on a free end region (10), bears the control device (11), wherein the free end region (10) is cranked towards the first adjustment lever (6), and a control arrangement geometry is defined by the relationship:

$$0.9 \leq a/(La/Li \cdot (b2+(c-d))-b/2) \leq 1.1$$

where the components in said relationship represent the following:

a: spacing between a first end region (15A), which faces toward the first adjustment lever (6), of the bearing bushing (3) and an engagement point (A) of the first adjustment lever (6);

La: effective length of the first adjustment lever (6);

Li: effective length of the second adjustment lever (9);

b: spacing between the first end region (15A) and a second end region (15B), which faces toward the second adjustment lever (9), of the bearing bushing (3); and c: spacing between the second end region (15B) and a longitudinal central line (L9) of the second adjustment lever (9);
d: spacing between the second end region (15B) and a force introduction point (M) at which the control device (11) is arranged.

\* \* \* \* \*